US005909191A

United States Patent [19]

Hirshfield et al.

[11] Patent Number: 5,909,191

[45] Date of Patent: Jun. 1, 1999

[54] MULTIPLE BEAM ANTENNA AND BEAMFORMING NETWORK

[75] Inventors: Edward Hirshfield, Cupertino; Evert C. Nygren, Los Altos; Ernesto A. Balderrama, Milpitas; George S. Cohen, Palo Alto, all of Calif.

[73] Assignee: Space Systems/Loral, Inc., Palo Alto, Calif.

[21] Appl. No.: 08/942,704

[22] Filed: Oct. 1, 1997

Related U.S. Application Data

[63] Continuation of application No. 07/714,244, Jun. 12, 1991, abandoned.

[51] Int. Cl.$^6$ ..................... G01S 7/40

[52] U.S. Cl. ..................... 342/174

[58] Field of Search ..................... 342/173, 174, 342/372

[56] References Cited

U.S. PATENT DOCUMENTS

| | | | |
|---|---|---|---|
| 3,202,990 | 8/1965 | Howells | 343/100 |
| 3,964,065 | 6/1976 | Roberts et al. . | |
| 4,106,015 | 8/1978 | Beguin et al. . | |
| 4,556,883 | 12/1985 | Strietzel | 342/174 |
| 5,412,414 | 5/1995 | Ast et al. | 342/174 |

OTHER PUBLICATIONS

Mayhan, Joseph T., "Adaptive Nulling with Multiple–Beam Antennas," *IEEE Transactions on Antennas and Propagation*, vol. AP–26, No. 2, Mar. 1978, U.S.A.

Mayhan, Joseph T., "Area Coverage Adaptive Nulling from Geosynchronous Satellities: Phased Arrays Versus Multiple– Beam Antennas," *IEEE Transactions on Antennas and Propagation*, vol. AP–34, No. 3, Mar. 1986, U.S.A.

Reed, Irving S., "The Electronic Battle: A New Era in Military Communications," *1985 IEEE Military Communications Conference*, Conference Record vol. 2 of 3, Oct. 20–23, 1985, Boston Massachusetts.

Table of Contents, *IEEE Transactions on Antennas and Propagation*, vol. AP–34, No. 3, Mar. 1986, special issue on adaptive processing antenna systems, U.S.A.

*Primary Examiner*—Theodore M. Blum

*Attorney, Agent, or Firm*—Fenwick & West LLP

[57] ABSTRACT

An antenna element and beamforming network (10) preferably comprises a plurality of radiators (12), a plurality of band pass filters (14) and a plurality of test couplers (16). Each radiator (12) is coupled to a dedicated MMIC (18). The output of MMICs (18) are coupled to a power stripline combiner (20) to provide a single output. Each of MMICs (18) is independently controllable to shape the antenna beams as desired for producing nulls in pattern coverage. The output of stripline combiner (20) may also be coupled through an output test coupler (46) to a jammer detector and correlator (24). In one embodiment, radiators (12) are horns that include filters (14). The output of each horn is coupled to the input of its dedicated MMIC (18). In another embodiment, radiators (12) are a patch array coupled together by a stripline combiner. The output of the stripline combiner is coupled by band pass filter (14) to the input of the respective MMICs (18). The present invention integrates these components into a single package with reduced size and weight.

11 Claims, 7 Drawing Sheets

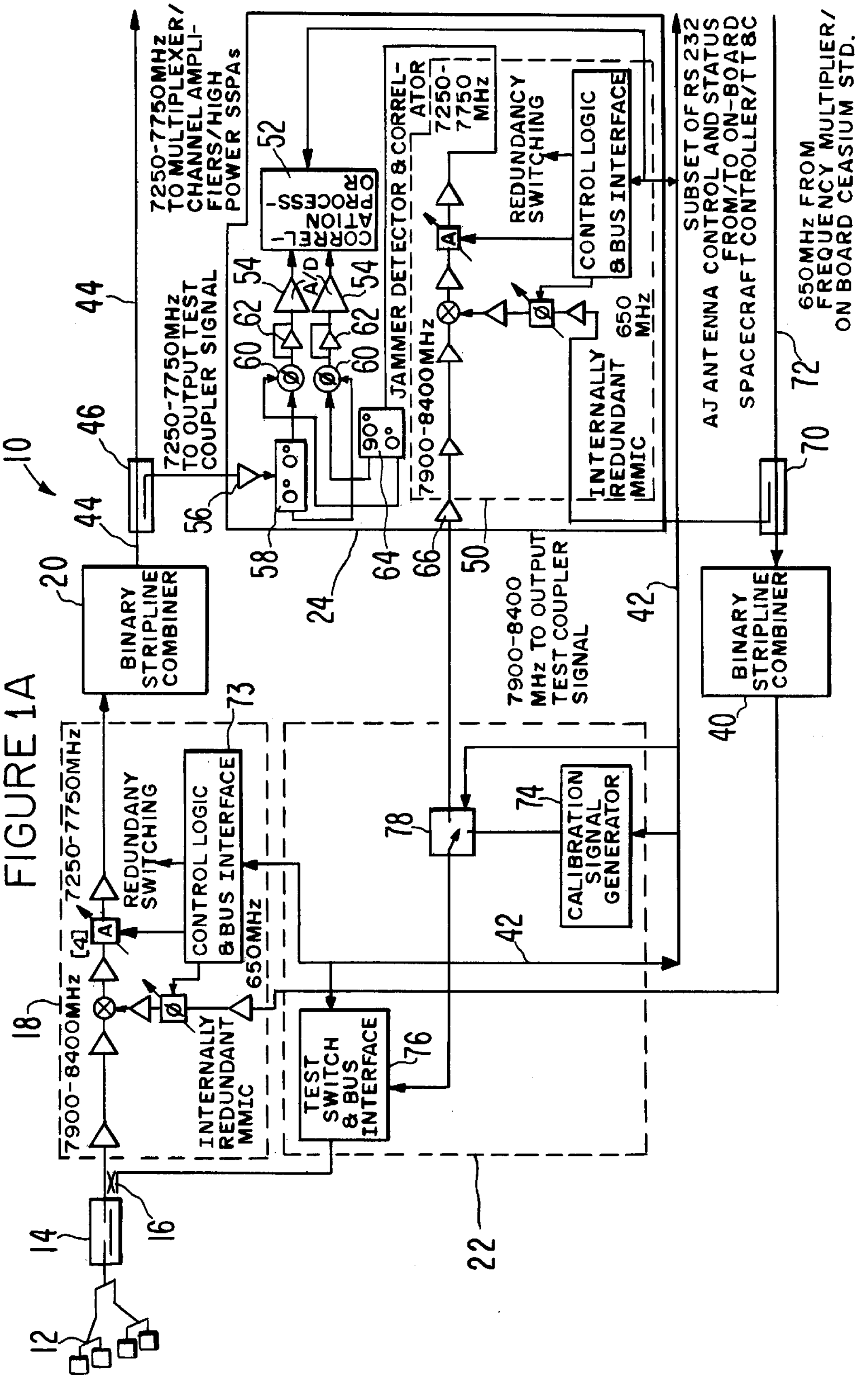
FIGURE 1A
10
12
14
16
18
7900-8400MHz
7250-7750MHz
[4]
A
REDUNDANY SWITCHING
CONTROL LOGIC & BUS INTERFACE
73
650MHz
INTERNALLY REDUNDANT MMIC
TEST SWITCH & BUS INTERFACE
76
78
74
CALIBRATION SIGNAL GENERATOR
42
22
20
BINARY STRIPLINE COMBINER
44
46
7250-7750MHz TO OUTPUT TEST COUPLER SIGNAL
7250-7750MHz TO MULTIPLEXER/ CHANNEL AMPLIFIERS/HIGH POWER SSPAs
52
CORREL-ATION PROCESS-OR
54
A/D
60
62
56
58
0° 0°
90° 0°
64
24
66
50
JAMMER DETECTOR & CORREL-ATOR
7900-8400MHz
7250-7750 MHz
650 MHz
REDUNDANCY SWITCHING
CONTROL LOGIC & BUS INTERFACE
SUBSET OF RS 232 AJ ANTENNA CONTROL AND STATUS FROM/TO ON-BOARD SPACECRAFT CONTROLLER/TT&C
7900-8400 MHz TO OUTPUT TEST COUPLER SIGNAL
40
BINARY STRIPLINE COMBINER
70
72
650MHz FROM FREQUENCY MULTIPLIER/ ON BOARD CEASIUM STD.

FIGURE 2
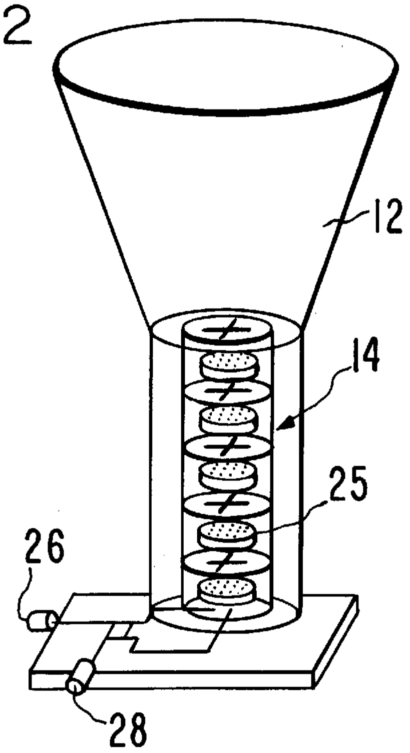
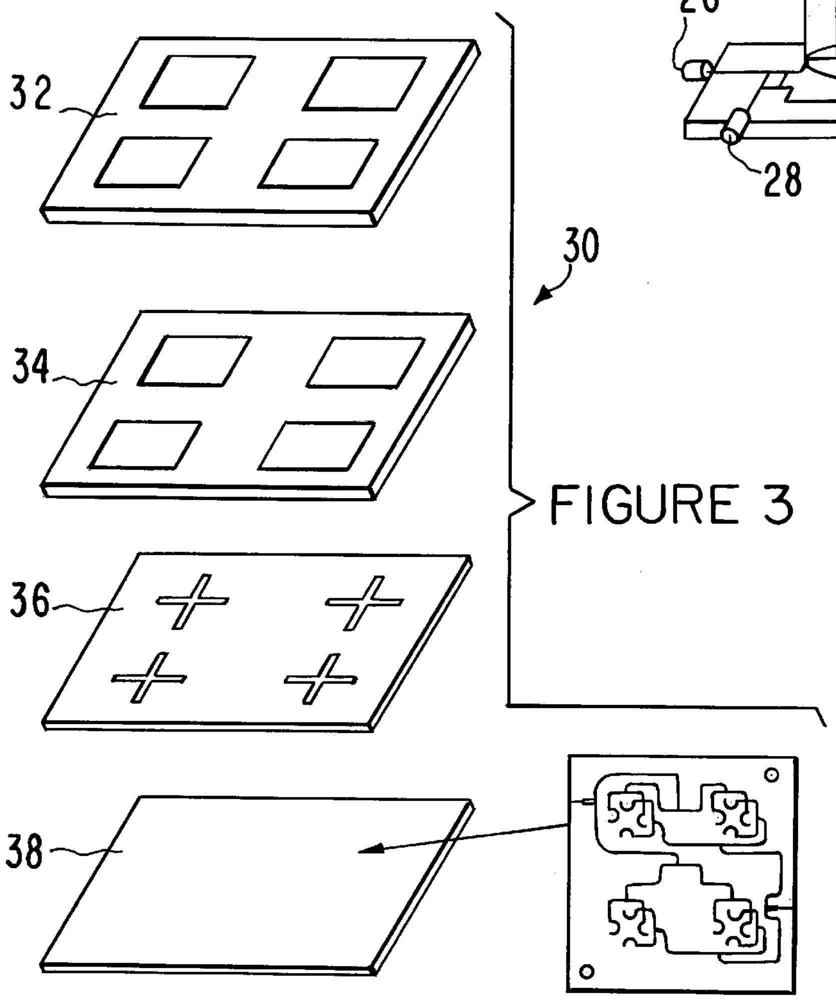
FIGURE 3

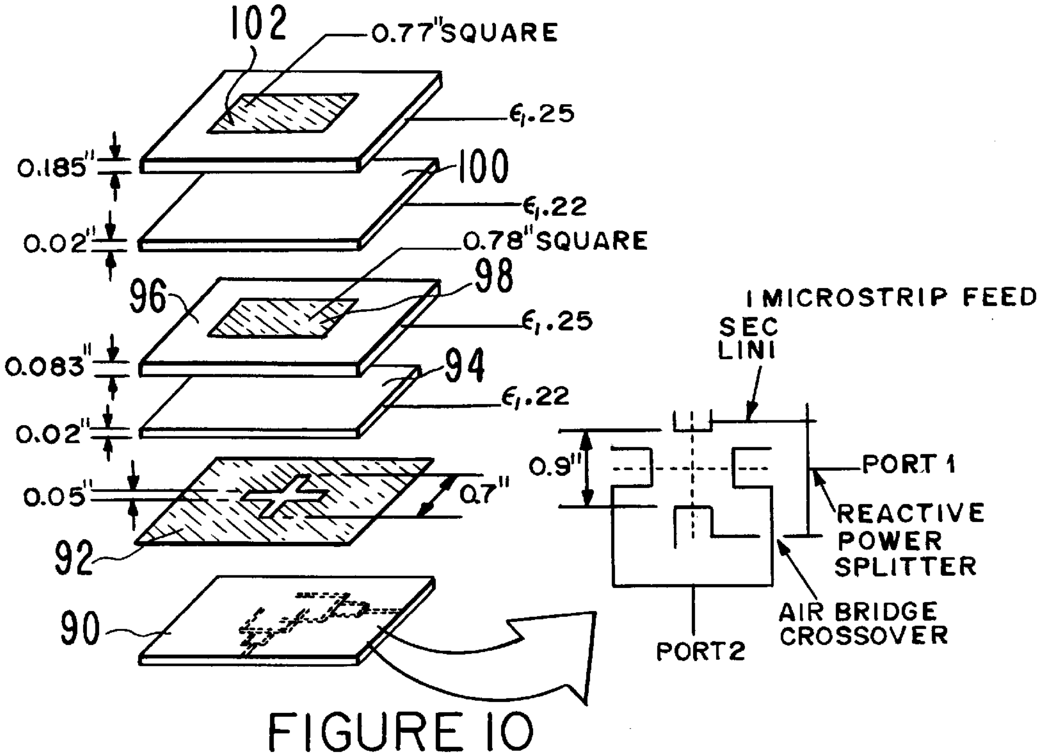
FIGURE 10
FIGURE 11
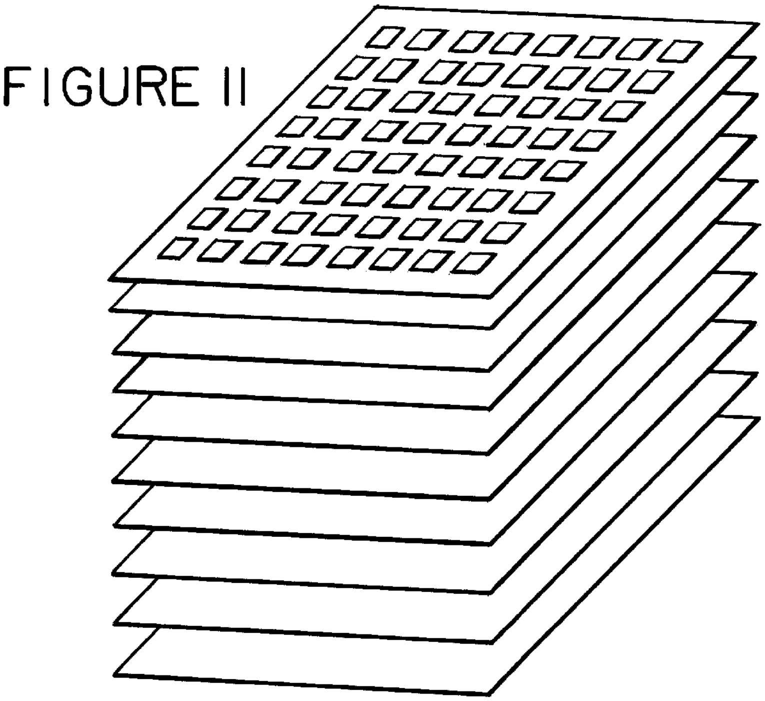

MULTIPLE BEAM ANTENNA AND BEAMFORMING NETWORK

RELATED APPLICATION

This is a continuation of U.S. patent application Ser. No. 07/714,244 filed on Jun. 12, 1991, now abandoned.

BACKGROUND OF THE INVENTION

1. Field of the Invention

The present invention relates generally to antennas and devices for receiving and transmitting microwave signals. In particular, the present invention relates to multiple beam or phased array antennas, antenna feeds, and beamforming networks.

2. Description of the Related Art

In the recent past, the number of satellites placed in geosynchronous orbit about the earth has increased significantly. Associated with the increase in the number of satellites is an increase in the microwave signals being transmitted from the surface of the earth and the noise being generated. Also, some satellite communication systems are susceptible to intentional jamming by those interested in disrupting communication. Therefore, modern antennas and beamforming networks must be more sophisticated to amplify signals of interest while nullifying noise and signals from other areas. In particular, receivers with the capability to produce nulls in pattern coverage to null out high power jamming signals is needed. Additionally, it is advantageous to send signals to a variety of users without wasting power by radiating the signals toward regions where there are no users of interest. There is also a need for the ability to point an antenna beam at a moving target without having to physically move the antenna elements. Therefore, there is a need for multiple beam antennas and beamforming networks with the ability to shape antenna beams for a variety of needs.

In an attempt to satisfy the need for antennas and beamforming networks for satellites, multiple-beam and phased array antennas have been developed. The prior art typically forms antennas and beamforming networks from machined or electro-formed horns, separate filters and delay line or ferrite phase shifters. These devices are coupled to wave guides and coaxial transmission lines as well as other microwave components. However, the configurations of the prior art are relatively large and heavy which is a particular disadvantage since the antennas are used in spacecraft where size and weight are critical because of the tremendous launch costs for spacecraft. These prior art antennas and phased arrays are also very difficult and expensive to implement on a recurring basis because the horns, filters and phase shifters are individual devices with characteristics that vary from device to device. Additionally, it is difficult and expensive to assemble these devices into antennas that will have uniform characteristics throughout the array.

The prior art also includes a variety of other antennas and receiving systems for microwave signals. For example, U.S. Pat. No. 3,953,857 to Jenks discloses an planar phase array that is mechanically rotatable about an axis for providing wider scanning limits for the array; U.S. Pat. No. 4,521,781 to Campi et al. discloses a microstrip antenna array including spaced radiator elements for easy scanning; U.S. Pat. No. 4,652,880 to Moeller et al. discloses an antenna feed network including power dividers to distribute two microwave signals; U.S. Pat. No. 4,734,700 to Brunner discloses an omni-directional scanning group antenna with electronically phase-control beam for precise target location; U.S. Pat. No. 4,766,438 to Tang discloses a lens antenna having four phased array apertures positioned for hemispherical coverage; and U.S. Pat. No. 4,799,065 a reconfigurable beam antenna system including a focusing means, an plurality of antenna elements and a feed network. These devices disclose a variety of antennas, however, none disclose the ability to produce nulls in pattern coverage to decrease the impact of high power jamming signals.

Thus, there is a need for an antenna and beamforming network with reduced size, cost and weight as well as the ability to produce nulls in pattern coverage.

SUMMARY OF THE PRESENT INVENTION

The present invention is an antenna element and beamforming network that is integrated into a single package. In a preferred embodiment, antenna element and beamforming network (10) comprises a plurality of radiators (12), a plurality of band pass filters (14), a plurality of test couplers (16), a plurality of monolithic microwave integrated circuits (MMIC) (18), a stripline power combiner (20), calibration circuit (22), and a jammer detector and correlator (24). The present invention receives and sends microwave signals with the plurality of radiators (12). The output of each radiator (12) is coupled by a respective test coupler (16) and dedicated MMIC (18). Each MMIC (18) is coupled to a co-located controller (73) and then to a computer (not shown) to receive control signals for independent control of each MMIC (18) to shape the antenna beams as desired for producing nulls in pattern coverage. The output of each MMIC (18) is coupled to stripline combiner (20) which combines the signals to provide a single composite signal of all radiators (12).

A calibration circuit (22) is coupled to test coupler (16) to input calibration signals to test the primary signal paths. A jammer detector and correlator (24) is also coupled to test couplers (16) by calibration circuit (22). The output of stripline combiner (20) is also coupled by a test coupler (46) to jammer detector and correlator (24). Using these signals, jammer detector and correlator (24) can be used to locate interfering signals for correlation with the combined output to establish nulls and gain in specific locations in the field of view.

BRIEF DESCRIPTION OF THE DRAWINGS

FIG. 1A is a block schematic diagram of a first embodiment of the antenna feed and beamforming network of the present invention;

FIG. 2 is a perspective view of a preferred embodiment of a radiator and band pass filter of the present invention;

FIG. 3 is an exploded perspective view of an alternate embodiment of a radiator of the present invention;

FIG. 10 is an exploded perspective view of another alternate embodiment of the radiator of the present invention; and FIG. 11 is an exploded perspective view of an alternate embodiment of the antenna feed and beamforming network of the present invention.

DESCRIPTION OF THE PREFERRED EMBODIMENTS

Figure 1B:
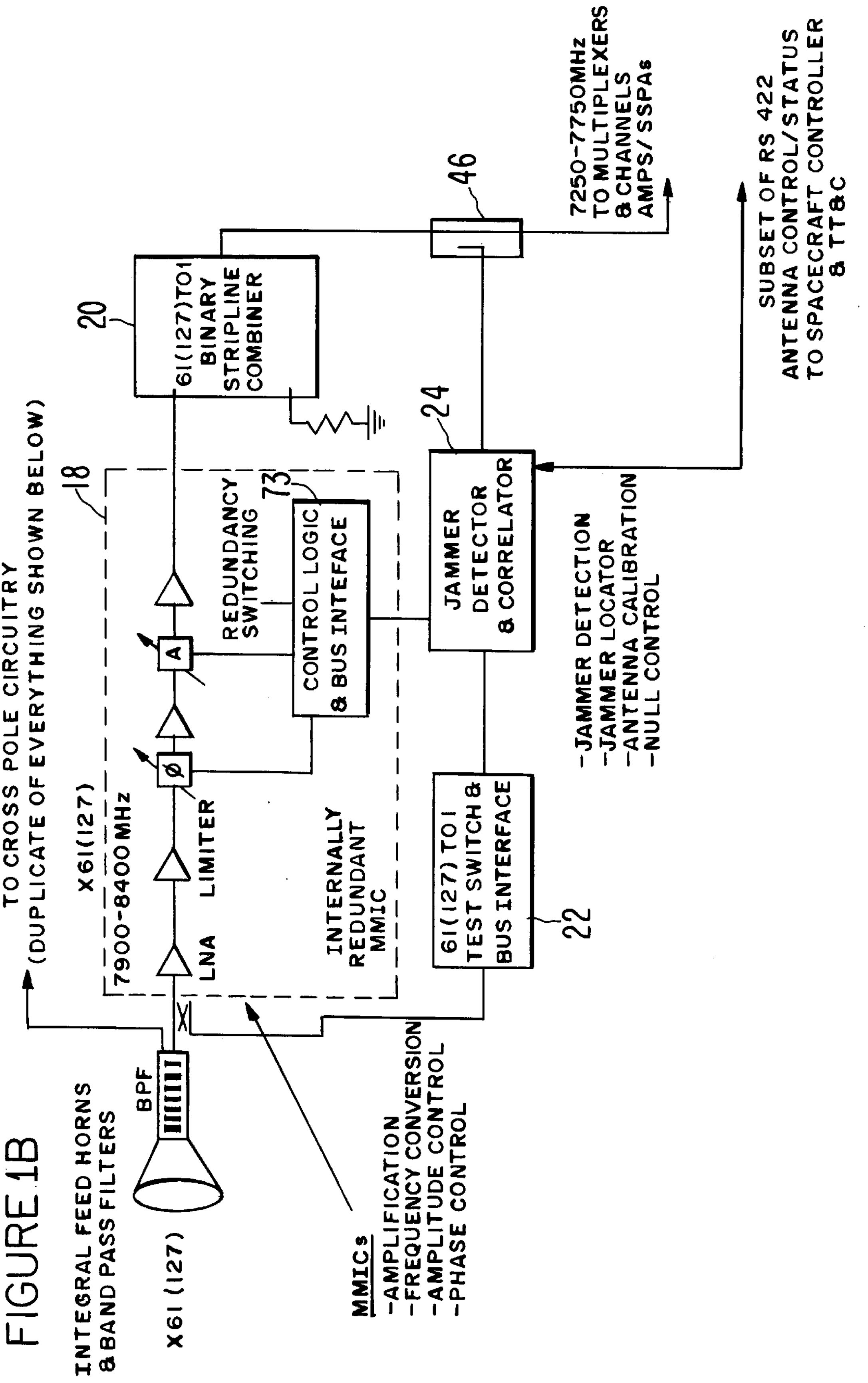
FIG. 1B is an block diagram of a second embodiment including a phase shifter in the signal path rather than the local oscillator path.

Referring to the schematic diagrams of FIGS. 1A and 1B, preferred embodiments of an antenna element and beamforming network 10 of the present invention is shown. Antenna element and beamforming network 10 of the present invention preferably comprises a plurality of radiators 12, a plurality of band pass filters 14, a plurality of test couplers 16, a plurality of monolithic microwave integrated circuits 18, a stripline power combiner 20, a calibration circuit 22, and a jammer detector and correlator 24. It should be understood that while the present invention includes a plurality of radiators 12, band pass filters 14, test couplers 16 and MMICs 18, FIG. 1 only shows a single radiator 12, band pass filter 14, test coupler 16 and MMIC 18 for simplicity and ease of understanding.

The present invention radiates and receives microwave signals with radiator 12. The present invention advantageously includes a plurality of radiators 12 to collect signals of interest and nullify noise. In a typical satellite configuration, the radiators 12 might be designed to illuminate a microwave mirror (reflector) or lens to direct the microwave energy to a geographical region on the surface of the earth. In an Multiple Beam Antenna (MBA) each radiating element illuminates a specific different region, so nulls may be generated over the location of a jammer by turning off an element or by combining the outputs of several elements (between 3 and 19) with relative phase relationships to cause localized cancellation of the signals in the region. The jammer correlation electronics detects and measures jammers and causes the controller 73 to adjust the phase shifters and attenuators in affected signal paths to cause cancellation. In an exemplary embodiment, antenna element and beamforming network 10 includes 61 radiators. The present invention also includes a plurality of band pass filters 14 to pass the desired band of frequencies and reject the undesired bands of frequencies. Each radiator 12 is coupled to a respective band pass filter 14 which filters the signal produced by its respective radiator 12. Each band pass filter 14 is preferably composed of high dielectric pucks and high "Q" resonators. For example, the dielectric may be constructed of zirconium-tin titanium dioxide and the resonators may be tuned to resonate at selected frequencies. The resonating dielectric pucks 25 are placed in cavities which are electromagnetically coupled to one another to form two orthogonal band pass filters. The filter would pass frequencies in the range of 7.25 GHz to 7.75 GHz and also reject signals in the 7.9 GHz and 8.4 GHz range. This is required to keep an adjacent transmitter from overloading the receiver channel. It should be understood to those skilled in the art that comparable materials that pass frequencies within the preferred range may also be used to construct band pass filter 14.

In the preferred embodiment, each radiator 12 and its respective band pass filter 14 are integrated into the structure shown in FIG. 2. Each radiator 12 is preferably a horn constructed of a lightweight material such as copper plated graphite epoxy or finely machined aluminum. Both circular, conical or square cross section inverted truncated pyramidal shapes with features for balanced E and H plane propagation are preferred with the band pass filter 14 formed in the base of the horn. Band pass filter 14 comprises several poles including a dual mode elliptical filter which allows the horizontally and vertically polarized channels to be launched into the radiating horn with very little loss and enough isolation to enable dual polarization frequency reuse. High Q dielectric resonators with high dielectric constant (e.g., 10) can be used to reduce size and weight and improve temperature stability. The frequency of the filter 14 is established by size of dielectric resonators 25 and to a lesser degree by the dimension of the cavities in which they are installed. The bandwidth and resonant mode is established by the size and shape of the irises coupling one cavity to another, and the horn and probes coupling the first stage of the filter 14 to the MMICs 18. Radiator 12 and band pass filter 14 advantageously support both right and left hand polarization. While radiator 12 and filter 14 shown in FIG. 2 is configured to support both right and left hand polarization, it should be understood by those of ordinary skill in the art that radiator 12 and filter 14 may be modified to support either only left hand polarization or only right hand polarization. Depending on the polarization desired, the appropriate output 26, 28 from filter 14 is coupled to the respective test coupler 16 and MMIC 18. To support both left and right hand polarization a test coupler 16 and MMIC 18 are needed for each output 26, 28.

In an alternate embodiment, each radiator 12 may comprise a patch array as shown in FIG. 3. FIG. 3 illustrates an exploded view of a low profile array feed cluster cell 30. The alternate embodiment of radiator 12, cluster cell 30, has four elements and comprises a first layer of radiating patch elements 32, a second layer of radiating patch elements 34, a layer of coupling slots 36 and a power distribution network 38. First layer of radiating patch elements 32 is placed in a parallel plane above second layer of radiating patch elements 34. Both the first and second layers 32, 34 are placed in a parallel plane above layer of coupling slots 36. Finally, these three layers 32, 34 and 36 are positioned above power distribution network 38. The structure of the distribution network 38 establishes the polarizations launched from the patches. The signals to and from cluster cell 30 are then output by power distribution network 38 through band pass filter 14 to test coupler 16. As with the preferred embodiment, a plurality of cluster cells 30 each having a respective band pass filter 14 is used to receive microwave signals. The patches are analogous to the horns described above.

As shown best in FIG. 1A, test coupler 16 is coupled between each band pass filter 14 and its respective MMIC 18. Each test coupler 16 is constructed in strip line. A Lange coupler or unbalanced resistive divider may be used. Each test coupler 16 is also coupled to calibration circuit 22. Test couplers 16 allow measurement of the incoming signal at each beam or radiator 12. Test couplers 16 also permit a calibrated test signal to be input into the respective MMIC 18 and through the other circuitry such as stripline combiner 20, and jammer detector and correlator 24 to test all primary signal paths or detect jammers in the geographical region illuminated by each respective radiator 12.

The output of each test coupler 16 is coupled to the input of a MMIC 18. The present invention provides a dedicated MMIC 18 for each radiator 12 to establish the noise figure, phase and amplitude of the channel before the loss embodied in the combining network to improve system sensitivity 12. Each MMIC 18 is a monolithic microwave integrated circuit including a low noise amplifier, mixer IF amplifier, and phase shifter. The MMICs 18 are co-located with a controller 73 that contains a universal synchronous asynchronous receiver/transmitter (USART), digital to analog converters, a microprocessor, buffers and memory. The MMICs 18 amplify, frequency convert, phase shift and attenuate the input signal in response to control signals sent to the MMIC 18. Each controller 73 has inputs for receiving control signals. The present invention also couples each MMIC 18 to receive a local oscillator signal from a stripline splitter 40.

The present invention also includes a control bus 42 for sending control signals to each MMIC 18, calibration circuit 22 and jammer detector and correlator 24. Control bus 42 is coupled to the control inputs of all 61 MMICs 18, as well as the control inputs of calibration circuit 22 and jammer detector and correlator 24. In the preferred embodiment, control bus 42 is also coupled to a computer (not shown) that provides digital signals to control the amplification, attenuation and phase shift performed by each MMIC 18. Control bus 42 is preferably a planar pattern of leads interconnecting MMICs 18. This planar pattern of leads in a ribbon like structure permits the conductors to pass under all MMICs with only one or two layer of etched copper. Each MMIC 18 has a unique address determined by a pattern of open or shorted connections to ground. All the commands travel along control bus 42 to all MMICs 18. Each individual MMIC 18 is able to determine if it is the intended recipient of the control signal by comparing the address of the command signal to the pattern of open and shorted connections for a match. If there is no match the particular MMIC 18 ignores the signal on control bus 42. On the other hand, if there is a match in between the address of MMIC 18 and the command signal on control bus 42 then MMIC 18 executes the command signal by modifying the signal received from its respective radiators 12. Thus, the present invention provides a plurality of MMICs 18 each of which is independently controllable to amplify and nullify signals from radiators 12 thereby allowing areas of interest in the antenna feed 10 to be focused upon.

The output of each MMIC 18 is coupled to a respective input on stripline power combiner 20. In the preferred embodiment, stripline combiner 20 has 61 inputs and a single output. Stripline combiner 20 forms a composite signal from all 61 signals input by MMICs 18. The output of stripline combiner 20 is coupled to a lead 44 that provides the output of the present invention with the desired pattern coverage.

Another test coupler 46 is also coupled to the output of stripline combiner 20. Test coupler 46 passes the signal from stripline combiner 20 to the output of the present invention and also provides the output of stripline combiner 20 to jammer detector and correlator 24.

Jammer detector and correlator 24 preferably includes a MMIC 50, a correlation processor 52, analog to digital converters 54, amplifiers 56 and 66, power splitter 58, phase detectors 60, integrators 62, and a hybrid 64. Jammer detector and correlator 24 receives signals from each individual radiator 12 via coupler 16 and switches 76 and 78. These signals are amplified by amplifier 66 and coupled to MMIC 50. The output of MMIC 50 is applied to a 90 degree hybrid 64 which drives the pair of phase detectors 60. The second input to each of the phase detectors 60 is derived from the output of combiner 20 via coupler 46. The phase detector 60 outputs are coupled to integrators 62. The signals from integrators 62 are converted to digital streams by the analog to digital converters 54 and applied to the correlation processor 52. As illustrated in FIG. 1, MMIC 50 is also coupled to control bus 42 to receive control signals and return data. MMIC 50 is also coupled to the system local oscillator input on line 72 by a coupler 70. Coupler 70 provides the system local oscillator input signal to MMIC 50 and stripline splitter 40.

The calibration circuit 22 preferably includes a calibration signal generator 74, a switch and bus interface 76 and a calibration switch 78. Signal generator 74, interface 76 and calibration switch 78 are coupled to control bus 42 to receive control signals. The signal generator 74 produces and outputs a test signal for testing the setting of the MMICs 18. The output of signal generator 74 is also coupled to calibration switch 78. Calibration switch 78 is coupled to the input of jammer detector and correlator 24. Thus, depending on the position of calibration switch 78 there is either a path between signal generator 74 and interface 76, or between correlator 24 and interface 76. Interface 76 is preferably a 64 to 1 test switch and bus interface, and coupled to the 61 test couplers 16 dedicated to radiators 12, respectively. Interface 76 selectively couples calibration switch 78 to one of the 61 test couplers 16 in response to control signal on control bus 42. Therefore, bus interface 76 and calibration switch 78 may be positioned to send a test signal from signal generator 74 to any one of the 61 test couplers 16, and its respective MMIC 18 and radiator 12. In the alternative, bus interface 76 and calibration switch 78 may be positioned to send the signal received by any one of the 61 radiators 12 and its respective band pass filter 14 to correlator 24 for comparison with the composite output signal on line 44.

Figure 4:
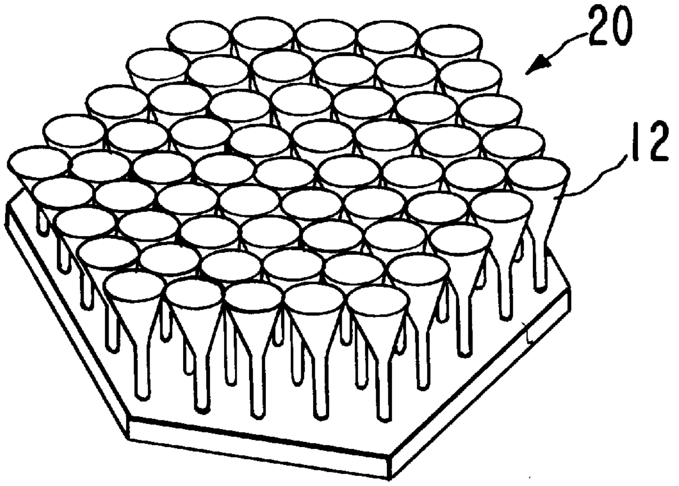
FIG. 4 is a perspective view of a preferred embodiment of the antenna feed and beamforming network of the present invention.
Figure 5:
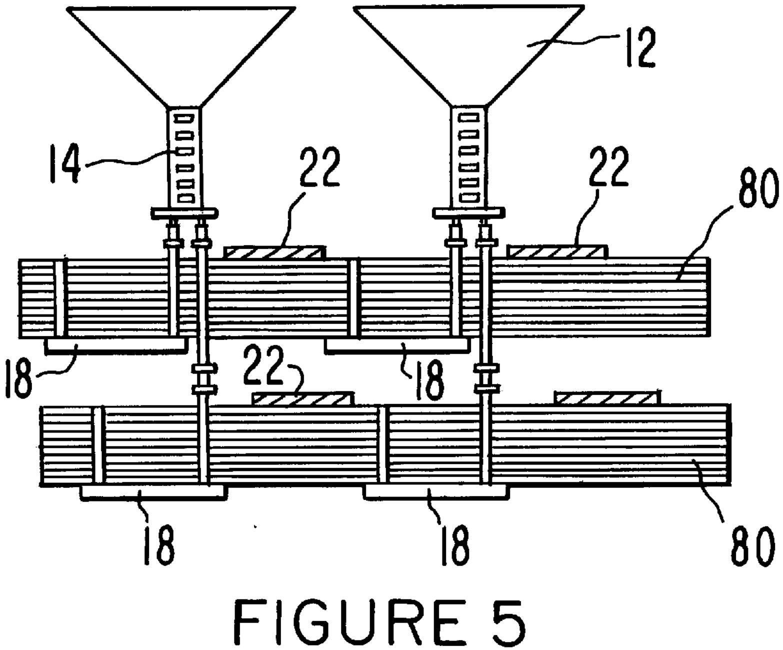
FIG. 5 is cross-sectional side view of a preferred embodiment of the antenna feed and beamforming network of the present invention.

Referring now to FIG. 4 and 5, the integrated single package forming antenna feed and beam forming network 10 of the present invention is illustrated. FIG. 4 shows a perspective view of a preferred embodiment with the plurality of radiators or horns 12. Most of the remaining portions of the present invention are constructed in the layers supporting the plurality of radiators 12. The present invention advantageously reduces the size and weight of antenna feed and beam forming network 10 by constructing the stripline combiner 20, calibration circuit 22, and correlator 24 with a beamforming network 80. As noted above, the preferred embodiment of the present invention supports both left and right hand circular polarization. The cross-sectional side view of FIG. 5 illustrates antenna feed and beam forming network 10 with two sets of MMICs 18 and beamforming networks 80 (one for each polarization). As shown in FIG. 5, beamforming networks 80 have calibration circuit 22 placed on the top layer and MMICs placed on the bottom layers. Each beam forming network 80 is comprised of several layers of circuitry including (from top to bottom) a calibration and aperture reuse switch layer, a ground plane, a calibration and aperture reuse switch interconnect layer, a ground plane, a control distribution interconnect layer, a control distribution layer, a ground plane, a L.O. distribution interconnect layer a ground plane, a L.O. distribution layer, a ground plane, a combiner interconnect layer, a ground plane, and a combiner layer.

Figure 6:
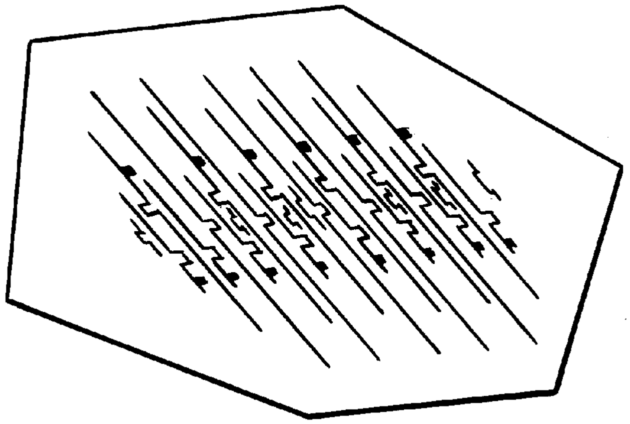
FIG. 6 is perspective view of a preferred embodiment of the stripline combiner layer of the present invention.

As shown in FIG. 6, the RF combiner layer is a series of interconnected stripline 2 to 1 combiners.

Figure 7:
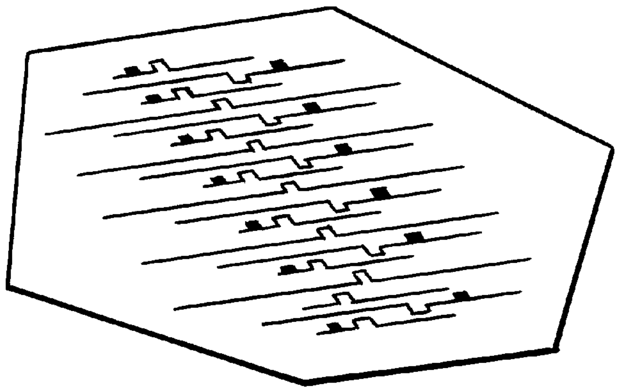
FIG. 7 is perspective view of a preferred embodiment of the L.O. distribution layer of the present invention.

As shown in FIG. 7, the L.O. Distribution layer is a series interconnected stripline 1 to 2 dividers.

Figure 8:
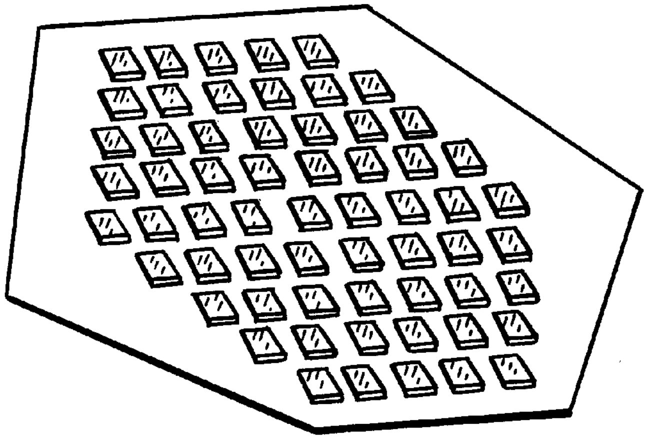
FIG. 8 is a bottom perspective view of a preferred embodiment of the MMICs of the present invention.

FIG. 8 illustrates a preferred layout for MMICs 18 of the present invention. Each MMIC 18 has similar semiconductor chip packaging and is mounted to the beam forming layers 80 by semi-rigid coaxial cable and solder points.

Figure 9:
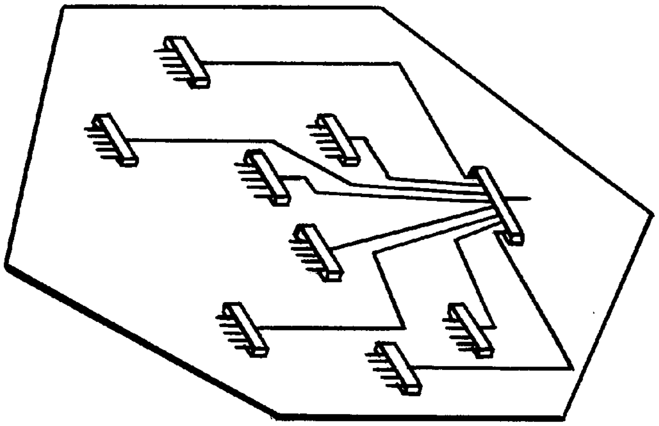
FIG. 9 is a top perspective view of a preferred embodiment of the calibration switch layer of the present invention.

FIG. 9 illustrates the calibration switch layer. The calibration switch 78 is preferably a single pole double throw voltage controlled MMIC switch.

Referring now to FIGS. 10 and 11, an alternate embodiment of the present invention is shown. In the alternate embodiment, the radiators 12 are formed from patch arrays as described with reference to FIG. 3. As shown in FIG. 10, each radiator consists of six layers. The bottom or first layer 90 contains the exciter that provides quadrature excitation which is in line with the crossed slots in a next layer 92. The second layer 92 is preferably copper clad. A third layer 94 provides the necessary spacing between the radiation excitation layer 90 and the first copper radiating patch 98 on a fourth layer 96. A spacer is used for a fifth layer 100 that separates the second radiating copper patch 102 from the first copper patch 98.

The radiators 12 are positioned in a planar array as shown in FIG. 11. Below the array, there are a series of layers that form the beamforming network. For each of the individual patches, the first six layers are as described in FIG. 10. The next four layers are made up of the necessary hybrids, band pass filters, amplifiers and phase shifters required for dual polarization operation with a phased array.

The above description is intended to illustrate the operation of the preferred embodiments and is not meant to limit the scope of the invention. The scope of the invention is to be delimited only by the following claims. From the above discussion, many variations will be apparent to one skilled in the art that would yet be encompassed by the true spirit and scope of the invention.

What is claimed is:

1. An antenna element and beamforming network comprising:

a radiator for transmitting and receiving microwave signals;

a filter having a first end and an output, the first end of said filter coupled to the radiator;

an integrated circuit having a signal input, a control input, and an output, said integrated circuit amplifying, frequency converting, phase shifting, and attenuating an input signal in response to a control signal, the signal input of the integrated circuit coupled to the output of the filter;

a combiner having a plurality of inputs and an output for producing a single signal from a plurality of input signals received, one of the plurality of inputs coupled to the output of the integrated circuit;

a detector and correlator for comparing the output of the combiner to the output of the filter, said detector and correlator coupled to the output of the combiner and the output of the filter; and a calibration circuit having first, second and third inputs and an output, the first input coupled by a test coupler to the output of the filter, the second input coupled to receive control signals, and the third input coupled to receive a test signal, the output of the calibration circuit coupled to the detector and correlator.

2. An antenna element and beamforming network comprising:

a plurality of radiators for transmitting and receiving microwave signals;

a plurality of filters each having a first end and an output, each of said plurality of filters having its first end coupled to a respective radiator;

a plurality of integrated circuits each having a signal input, a control input, and an output, each of said plurality of integrated circuits amplifying, frequency converting, phase shifting, and attenuating a signal in response to a control signal, each of the integrated circuits having its signal input coupled to the output of a respective one of said plurality of filters;

a combiner having a plurality of inputs and an output, each of the inputs of said combiner coupled to the output of one of the plurality of integrated circuits, said combiner producing a single output signal from the plurality of radiators' signals; and a detector and correlator for comparing the output of the combiner with a signal associated with each radiator, said detector and correlator coupled to the output of the combiner and to the output of a filter.

3. An antenna element and beamforming network comprising:

a plurality of radiators for transmitting and receiving microwave signals;

a plurality of filters each having a first end and an output, each of said plurality of filters having its first end coupled to a respective radiator;

a plurality of integrated circuits each having a signal input, a control input, and an output, each of said plurality of integrated circuits amplifying, frequency converting, phase shifting, and attenuating a signal in response to a control signal, each of the integrated circuits having its signal input coupled to the output of a respective one of said plurality of filters;

a combiner having a plurality of inputs and an output, each of the inputs of said combiner coupled to the output of one of the plurality of integrated circuits, said combiner producing a single output signal from the plurality of radiators' signals; and a plurality of filters each having an input and an output, said plurality of filters positioned in respective ones of said plurality of feed elements with the inputs of respective filters coupled to the feed elements;

a plurality of integrated circuits each having a signal input, a control input and a signal output, each of said plurality of integrated circuits amplifying, frequency converting, phase shifting and attenuating a signal in response to control signals received at said control input, the signal input of each integrated circuit coupled to the output of a respective filter;

a test switch having a plurality of signal inputs, a control input and a signal output;

a plurality of test couplers each coupling the output of one filter to one signal input of the test switch;

a calibration circuit having a signal input, a control input and an output, the signal input of the calibration circuit coupled to the signal output of the test switch and the control input of the calibration circuit coupled to receive control signals;

a combiner circuit having a plurality of inputs and an output, each of the inputs of said combiner circuit coupled to the signal output of one of said plurality of integrated circuits, said combiner circuit producing an output signal from the plurality of signal outputs of the integrated circuits; and a detector and correlator having a first input, a second input and control inputs for comparing the output of the combiner circuit to signals produced by the feed elements, the first input of the detector and correlator coupled to the output of the calibration circuit and the second input of the detector and correlator coupled to the output of the combiner circuit.

4. The antenna element of claim 3, wherein the calibration circuit further comprises a 64 to 1 test switch, a calibration switch and a calibration signal generator.

5. The antenna element of claim 3, wherein the test couplers detect signal levels at the filter outputs and are Lange couplers.

6. The antenna element of claim 2, wherein the plurality of filters are band pass filters composed of high dielectric and high "Q" resonators.

7. The antenna element of claim 2, wherein the plurality of integrated circuits are monolithic microwave circuits.

8. The antenna element of claim 7, wherein each integrated circuit may be independently controlled by said control inputs to provide amplification, frequency conversion, phase shifting and attenuation of the signal input.

9. The antenna element of claim 3, wherein the plurality of integrated circuits, the plurality of filters and the combiner are integrated into a single package of multi-layer copper plated circuit card and monolithic microwave integrated circuits.

10. A antenna element and beamforming network comprising:

a plurality of feed elements;

a plurality of filters each having an input and an output, said plurality of filters positioned in a respective one of said plurality of feed elements with the input of respective filter coupled to the feed element;

a plurality of integrated circuits each having a signal input, a control input and a signal output, said plurality of integrated circuits amplifying, frequency converting, phase shifting and attenuating a signal in response to control signals received at said control input, the signal input of each integrated circuit coupled to the output of a respective filter;

a test switch having a plurality of signal inputs, a control input and a signal output;

a plurality of test couplers each coupling the output of one respective filter to one signal input of the test switch;

a calibration circuit having a signal input, a control input and an output, the signal input coupled to the signal output of the test switch and the control input coupled to receive control signals;

a combiner circuit having a plurality of inputs and an output, each of the inputs of said combiner coupled to the signal output of one of said plurality of integrated circuits, said combiner producing an output signal from the plurality of signals received; and a detector and correlator having a first input, a second input and control inputs for comparing the output of the combiner to signals produced by the radiators, the first input coupled to the output of the calibration circuit and the second input coupled to the output of the combiner.

11. The antenna element and beamforming network of claim 10, wherein said plurality of integrated circuits are a plurality of monolithic microwave integrated circuits.

* * * * *